May 3, 1927. 1,626,715
C. H. AU
CURRENT METER
Filed Oct. 28, 1925 2 Sheets-Sheet 2
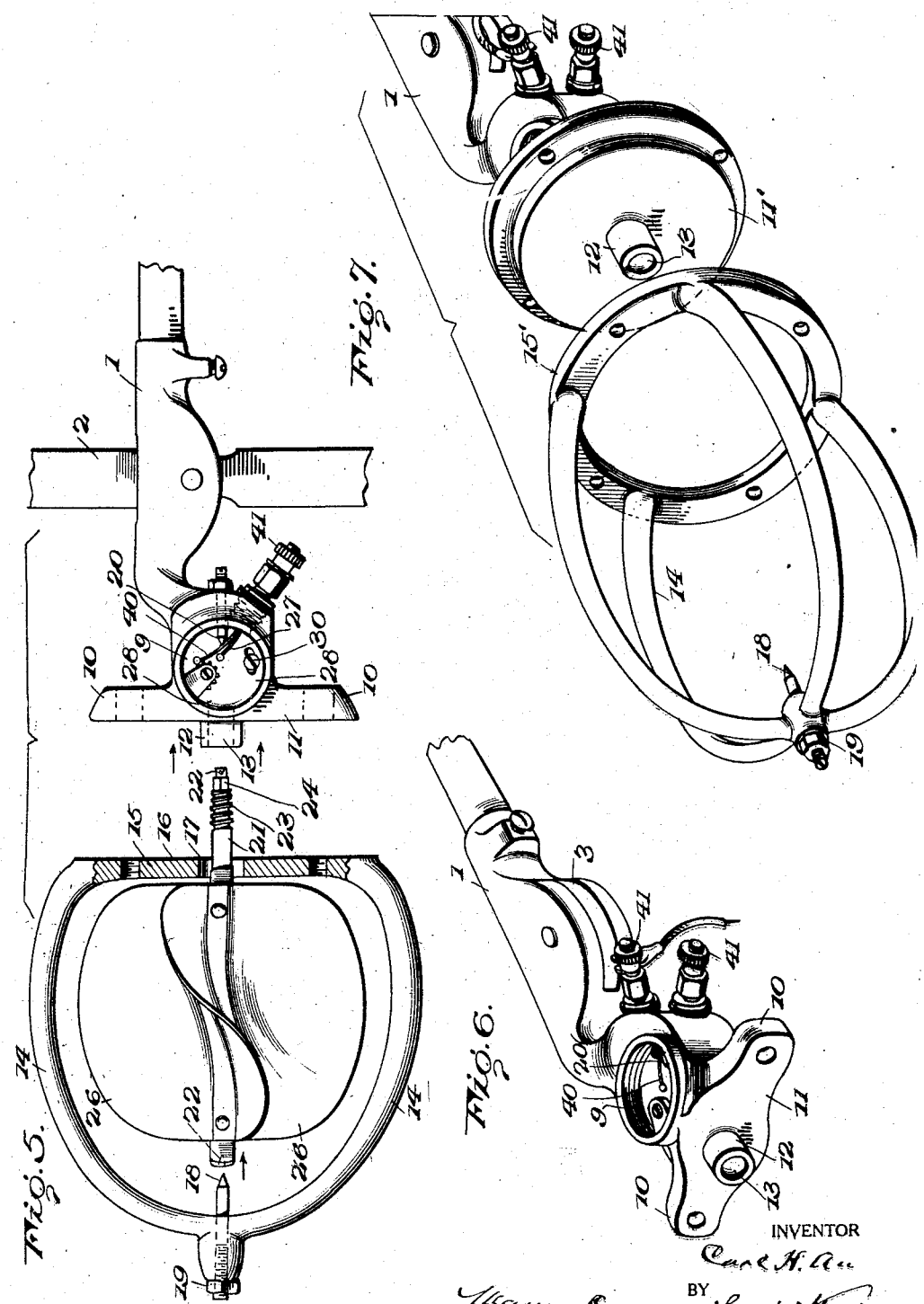
INVENTOR
Carl H. Au
BY
ATTORNEYS Patented May 3, 1927.

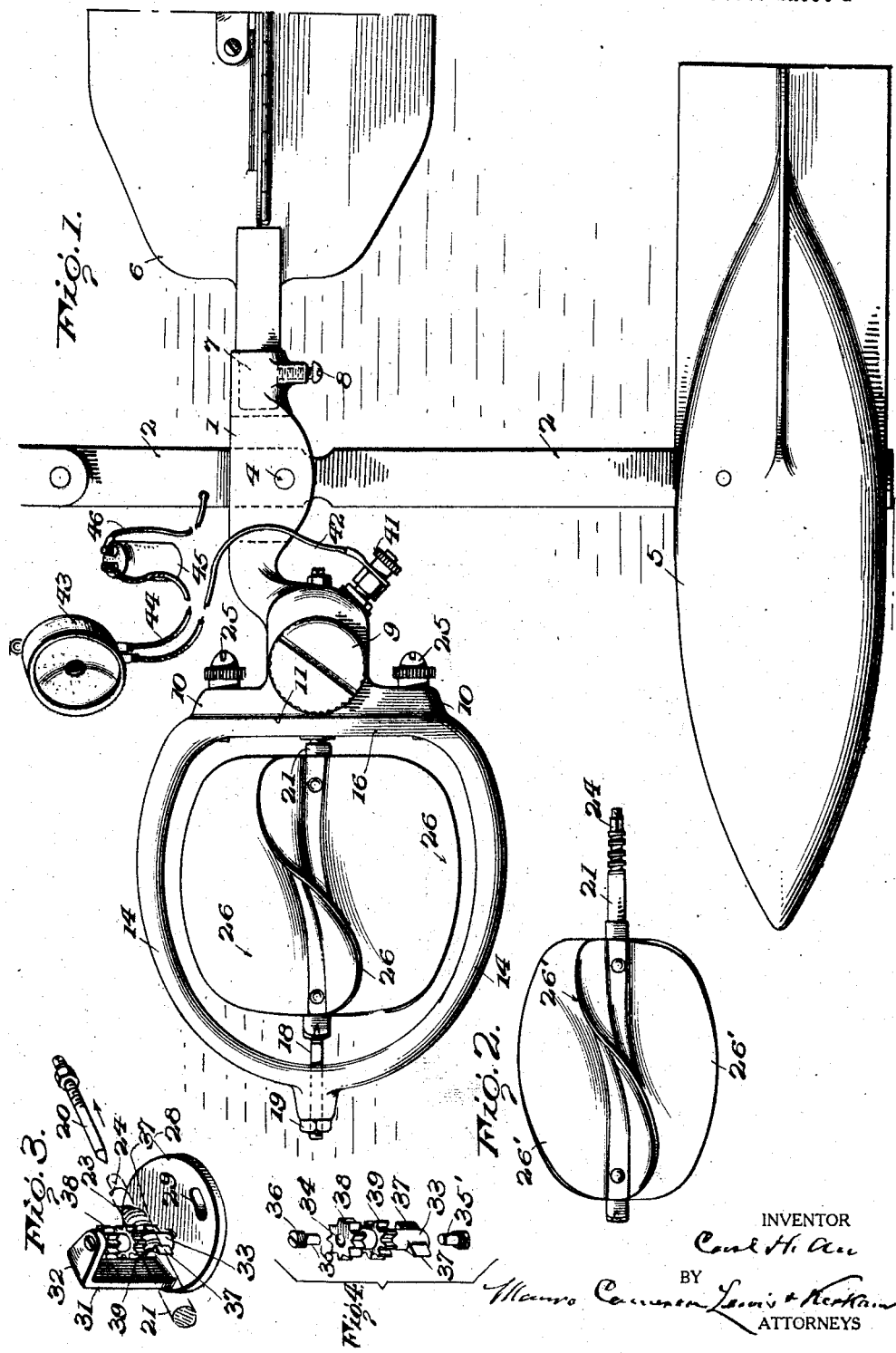

1,626,715

UNITED STATES PATENT OFFICE.

CARL H. AU, OF WASHINGTON, DISTRICT OF COLUMBIA, ASSIGNOR OF ONE-HALF TO JOHN C. HOYT, OF WASHINGTON, DISTRICT OF COLUMBIA.

CURRENT METER.

Application filed October 23, 1925. Serial No. 65,451.

This invention relates to axial flow meters of the electric type for liquids and gases. One of the more common uses to which meters of this character is put, is the measuring of the flow of water in streams, conduits and the like, and the present invention will be described in connection with this use, but it is to be expressly understood that it is described simply as an illustrative use and that the invention is not to be thereby limited to such use.

In axial flow meters, as hertofore constructed, the propeller, which is driven by the water flow, has been supported on overhang bearings, which produce a large amount of friction, and this friction has been so serious that such meters were practically useless for low velocities. Moreover, the meters have been so constructed as to be difficult to take apart and clean, and such cleaning is essential if the sensitiveness of the device is to be maintained, since dirt and sediment in the bearings greatly increases the friction of the parts, and, hence, the reliability of the meter.

The present invention provides improved means for supporting the propeller, and improved and more sensitive bearings and a better balance of the meter. The invention consists in the construction and combination of elements hereinafter described and defined in the appended claims.

The inventive idea may be embodied in a variety of forms, one of which for the purpose of illustrating the invention is shown in the accompanying drawings, but it is to be expressly understood that such drawings are for the purpose of illustration only, and are not designed to define the limits of the invention, reference being had to the appended claims for this purpose.

In said drawings—

Fig. 1 is a side elevation of one form which the meter may assume;

Fig. 2 is a side elevation of one form of propeller employed and the spindle driven thereby;

Fig. 3 is a detail in perspective showing the means of adjusting a worm wheel driven by a worm on the propeller spindle;

Fig. 4 is a detail side elevation of the worm wheel, the shaft on which it is mounted and the parts driven thereby;

Fig. 5 is a side elevational detail view illustrating the manner of disassembling the meter;

Fig. 6 is a perspective view of the supporting stem of the meter and the contact chamber; and Fig. 7 is a perspective view showing a different form of yoke from that shown in the other figures and a modified form of securing the same to the meter stem.

Referring to the drawings, in which like reference numerals indicate like parts throughout the several views, 1 is the usual or any suitable meter stem provided with means, as a staff 2, here shown as passing through a mortise 3 in the stem 1, Fig. 6, and pivoted to said stem by pivot 4. To the lower end of the staff 2 is secured the usual or any suitable weight 5, and to the rear end of stem 1 is secured the usual or any suitable tail piece 6, preferably through a socket connection 7 and set screw 8. All of the parts thus far described may be of the usual or any desired construction. On the forward end of the stem 1 is mounted a contact chamber 9, here shown as cylindrical in form and extending horizontally into the stem, as will be clearly understood from an inspection of Figs. 1 and 5, in which Fig. 1 shows the contact chamber with a closing cap in position thereon, and Fig. 5 shows the same with the cap removed. On the extreme forward end of the stem 1, said stem is provided with a forward face or shoulder to which the propeller supporting means is firmly secured. This forward face or shoulder may assume different forms, dependent upon the particular form of propeller supporting means employed. As shown in Figs. 1 and 2, it has the form of two oppositely extending lugs 10, 10 at the extreme forward end of the stem 1, and these lugs together with the end of the stem itself, form a plane surface 11, from which projects a hub 12. Fig. 5, having an opening 13 therethrough, which opening extends into the contact chamber 9 for a purpose hereinafter to be described.

The means for supporting the propeller of the meter may also assume various forms, and, as here shown, is in the form of a two-armed yoke 14, the arms of which at their rear ends are formed integral with or otherwise secured to a bridge piece 15, having a plane face 16 and a central opening 17 therethrough. The forward ends of the arms of the yoke 14 are curved toward each other, and centrally located at the point where they unite, is a pivot point bearing 18 screw-threaded through the yoke, as shown, and held in position by a lock nut 19. A corresponding pivot point bearing 20 is similarly mounted in the contact chamber 9, see Fig. 5. A spindle 21, having hardened cup bearings 22, 22 at the opposite ends thereof, is mounted between the pivot bearings 18 and 20, the rear end of said spindle extending through the opening 17 and the hub 12 into and nearly across the contact chamber 9, and on the portion within the chamber it has a worm 23 formed thereon and one or more contact points 24. The yoke is firmly secured to the forward face or shoulder 11 by means of screws 25, 25, Fig. 1, passing through the lugs 10, 10 and engaging the bridge piece 15 with the faces 11 and 16 in firm contact with each other. These screws 25 are preferably knurled to the end that they may be readily operated by hand.

On that portion of the spindle 21 lying within the yoke 14, are mounted suitable propeller blades 26, 26. These propeller blades may be either broad blades, as shown in Figs. 1 and 5, which form would be used where the water was of considerable depth, or they may be narrow blades, such as 26′, 26′, shown in Fig. 2, for use in shallow water.

Mounted in the wall of the contact chamber 9, is a make-and-break contact brush 27, preferably in the form of twisted strands of bronze wire, and having on its inner end a nob or wiping end, while its outer end is mounted in a suitable stem passing through the wall of the contact chamber but insulated therefrom, the mounting being such that the stem, together with the contact brush, may be readily removed without disturbing the insulating member. The specific construction of this brush and its mounting form no part of the present invention, and, hence, need not be described in detail herein, the same being specifically described and claimed in my co-pending application, Serial No. 63,089, filed on the 17th day of October, 1925. This contact brush is so positioned in the contact chamber that, during the revolutions of the spindle 21, it makes wiping contact with the contact point 24 on the spindle, thus effecting a make-and-break contact therewith at each revolution of the spindle 21. It will, of course, be appreciated that two such contact points 24, may be formed on opposite sides of the shaft, in which case there would be a plurality of make-and-break contacts with the brush at each revolution of the spindle.

Referring now to Figs. 3, 4 and 5, 28 is a disc having approximately the diameter of the interior of the contact chamber 9. This disc is mounted in the closed end of the contact chamber, and is provided with a slot 29, see Fig. 3, through which extends a screw 30, by means of which the disc is held in position in the chamber. By loosening the screw, the disc may be turned around its axis, which is the axis of the chamber, to the extent permitted by the slot 29, when the screw may be again tightened and the disc held in its adjusted position. Projecting from the face of the disc at its periphery, is an arm 31, Fig. 3, having an overhanging bracket 32, and a shaft 33 is mounted to turn in bearings supported in the bracket 32 and in the disc. This shaft with its bearings is shown in Fig. 4. The shaft has bearing openings 34 in either end thereof, and a bearing spindle 35 extends through the bracket 32 and into said bearing opening 34, the outer portion of the spindle being screw-threaded as at 36, by means of which it is retained in position in the bracket 32. A similar bearing 35′ extends upward through the disc 28 into the other end of the shaft 33, as will be readily understood from an inspection of Figs. 3 and 4. The bearings 35, 35′ for the shaft 33 are eccentric to the disc 28. On the shaft 33 is formed a plurality of contact points 37, and near the other end of the shaft is secured a wheel 38 having a plurality of teeth, as clearly shown in Figs. 3 and 4, the number of teeth on said wheel corresponding to the number of teeth on a worm wheel 39, keyed to the shaft 33 between the contact points 37 and the contact wheel 38.

By adjusting the disc 28 around its axis, the worm wheel 39 may be brought into operative engagement with the worm 23, on the spindle 21, or the disc may be so adjusted as to throw the worm wheel 39 out of engagement with the worm 23, as desired. Mounted in the wall of the contact chamber is a second contact brush 40, Fig. 5, the construction and mounting of which in every respect corresponds to that of the contact brush 27, except that the brush is slightly longer, so as to be in position to make wiping contact with either the contact points 37, or the contact wheel 38, as may be desired.

The contact brushes are provided with suitable binding screws 41, whereby a circuit wire 42 is secured in electrical contact with the brush, said wire passing to a suitable signaling device, as a telephone 43, connected by wire 44 to a source of electrical energy, as a battery 45, which battery in turn is connected by wire 46 to any suitable means for completing the circuit, here shown as the staff 2, from which the current returns through the water to the spindle 21. At each revolution of the spindle, the circuit is closed when the contact brush wipes the contact point 24 on the spindle, and is broken when the brush leaves said contact of a horizontal stem, a yoke removably secured to the forward end thereof, a contact-chamber mounted on said stem, a bearing in said chamber, an adjustable bearing in the forward part of said yoke, and a current-driven horizontal spindle turning on said bearings, whereby said yoke and spindle may be readily disassembled.

4. In an axial flow meter, the combination of a horizontal stem having a forwardly facing member, a yoke, manually operated means holding said yoke against said member, a contact chamber carried by said stem to the rear of said member, two removable bearing-points, one in said chamber and one on said yoke, and a current-driven spindle supported in said bearings, whereby said yoke and spindle may be readily removed from said stem for cleaning or packing.

5. In an axial flow meter, the combination of a contact chamber, a horizontal current-driven spindle projecting into said chamber, a worm on said spindle, a shaft extending transverse to said spindle and having a worm wheel secured thereon, and means adjusting said shaft around the axis of said chamber.

6. In an axial flow meter, the combination of a stem, a contact chamber carried by one end of said stem, a face block rigidly secured to said stem in front of said chamber, a face member abutting said face block, a yoke having its arms secured to said face member, manually operable means securing said block and member together, a horizontal current-driven spindle extending through said face block and member and into said chamber, and two bearings for said spindle, one in said chamber and one on said yoke.

7. In an axial flow meter, the combination of a stem, a contact chamber on the forward end thereof, a face plate having a forwardly projecting hub with an opening therethrough into said chamber, a yoke, a rearward face plate to which said yoke is secured and having an opening into which said hub projects, manually operable means firmly securing said face plates together, two bearing points, one in said yoke and one in said chamber, and a current-driven spindle extending through said hub and taking bearing on said bearing points.

8. The combination of a contact chamber, a driven spindle projecting into said chamber, a worm on said spindle, a shaft extending transverse to said spindle and having a worm wheel secured thereon, and means adjusting said shaft around the axis of said chamber.

In testimony whereof I have signed this specification.

CARL H. AU